K. J. LAGESON.
COVER FOR VEHICLE WHEELS.
APPLICATION FILED FEB. 19, 1912.
1,048,183.
Patented Dec. 24, 1912.
2 SHEETS—SHEET 1.
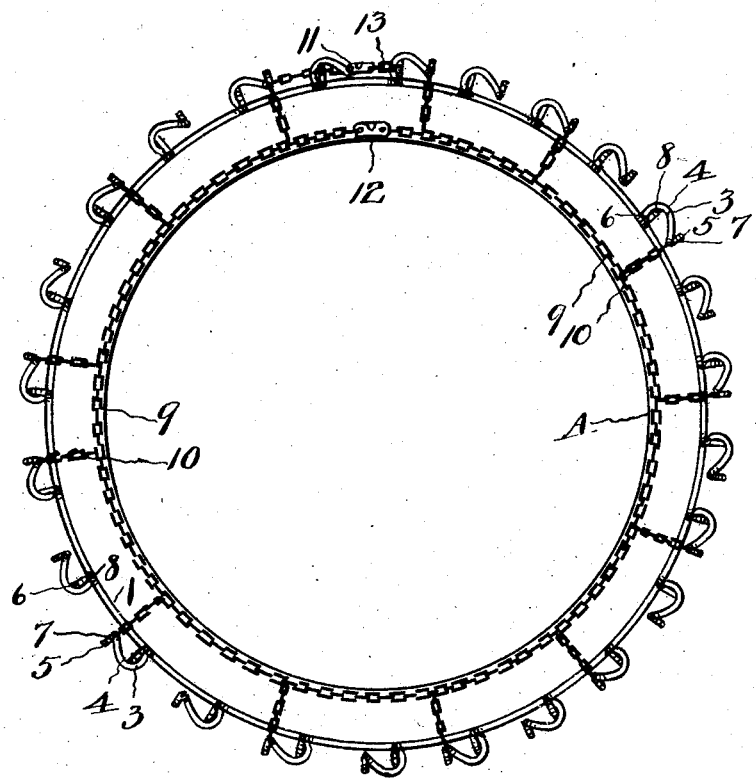
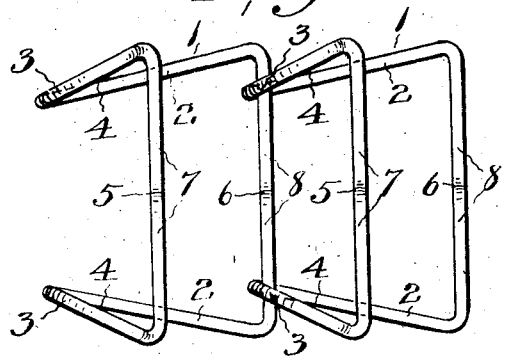
WITNESSES
INVENTOR:

K. J. LAGESON.
COVER FOR VEHICLE WHEELS.
APPLICATION FILED FEB. 19, 1912.
1,048,183.
Patented Dec. 24, 1912.
2 SHEETS—SHEET 2.
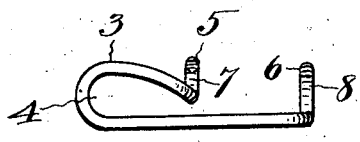
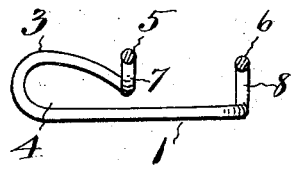
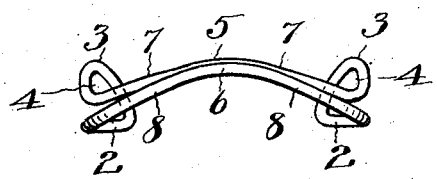
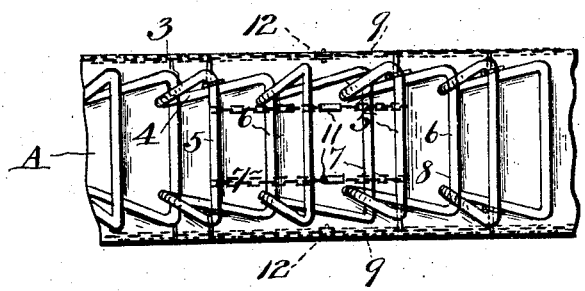
WITNESSES
INVENTOR:
Attorney

UNITED STATES PATENT OFFICE.

KNUT J. LAGESON, OF BENSON, MINNESOTA.

COVER FOR VEHICLE-WHEELS.

1,048,183.  Specification of Letters Patent.  Patented Dec. 24, 1912.

Application filed February 19, 1912. Serial No. 678,549.

*To all whom it may concern:*

Be it known that I, KNUT J. LAGESON, a citizen of the United States, and a resident of Benson, in the county of Swift and State of Minnesota, have invented certain new and useful Improvements in Covers for Vehicle-Wheels, of which the following is a specification.

My invention relates to devices for preventing automobiles from skidding on wet or muddy roads, and has for its object the provision of a chain-tread of novel construction consisting of links shaped to fit the tread of the tire and having integral loop portions on the two sides of the links that form projections engaging the road surface and preventing side slipping of the wheel.

My invention will be described in detail hereinafter and illustrated in the accompanying drawings, in which—

Figure 1 is a side view of a wheel equipped with one of my improved covers; Fig. 2, a plan view of the tread of the wheel with the cover in place; Fig. 3, an enlarged fragmental plan view of two of the links of the tread portion of the cover; Fig. 4, a longitudinal sectional view of one of the links; Fig. 5, a side view of one of the links; and Fig. 6, an end view thereof.

In the drawings similar reference characters will be used to designate corresponding parts throughout the several views.

The tread portion of my improved anti-skid cover is composed of links 1, each of which is as wide as the tread of the wheel A and formed of a bar of metal, the sides of the links being bent inwardly intermediate of the ends, as shown at 2, and one end of each link is bent outwardly and back on itself, as shown at 3, forming loops 4 that inclose the end bar of the adjacent link, the end bar 5 of the bent-back portion being positioned approximately midway between the end bar 6 of the link of which said end bar 5 is a part, and the end bar inclosed by the loops 4 thereof. All of the end bars 5 and 6 are curved outwardly, as shown at 7 and 8, respectively, to fit the curvature of the wheel-tire tread and serve as projections to prevent slipping of the wheel in rotation. The loops 4 extend outwardly so that they bear against the surface of the roadway and form projections that prevent side slip of the wheel in making curves on slippery roadways. The tread portion of the cover is held in position by means of chains 9, that extend lengthwise of the wheel-tire and are secured to links 2 at intervals around the tread portion by short chains 10. The ends of the tread portion are connected by suitable fastening means 11, and the chains 9 are also provided with suitable fastening means 12 to secure them in position on the wheel-tire.

Having thus described my invention, what I claim is—

An anti-skid cover for vehicle-wheels comprising a chain having each of its links formed with a cross-bar curved to conform to the tread of the tire, the side bars of the link formed on converging planes, each of said side bars bent backwardly, downwardly and laterally thereof, and an end bar connecting said bent-back portions that is curved outwardly to conform to the tread of the tire, substantially as shown and described.

In witness whereof, I have hereunto set my hand in presence of two subscribing witnesses.

KNUT J. LAGESON.

Witnesses:
 MICHAEL MAGUIRE,
 ANNA JOHNSON.

Copies of this patent may be obtained for five cents each, by addressing the "Commissioner of Patents, Washington, D. C."